US007848271B2

(12) United States Patent
Salomone et al.

(10) Patent No.: US 7,848,271 B2
(45) Date of Patent: Dec. 7, 2010

(54) SYSTEM AND METHOD FOR CONSERVING POWER FOR A WIRELESS DEVICE WHILE MAINTAINING A CONNECTION TO A NETWORK

(75) Inventors: Leonardo Jose Silva Salomone, Waterloo (CA); Michael Peter Montemurro, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 741 days.

(21) Appl. No.: 11/768,308

(22) Filed: Jun. 26, 2007

(65) Prior Publication Data

US 2009/0003252 A1  Jan. 1, 2009

(51) Int. Cl.
*G08C 17/00* (2006.01)
(52) U.S. Cl. .................. 370/311; 370/328; 370/338; 370/310
(58) Field of Classification Search .......... 370/311, 370/310, 328, 338
See application file for complete search history.

(56) References Cited

U.S. PATENT DOCUMENTS

| 2004/0017814 | A1* | 1/2004 | Shimada ............... 370/395.52 |
| 2005/0254444 | A1 | 11/2005 | Meier et al. |
| 2006/0025181 | A1 | 2/2006 | Kalofonos et al. |
| 2006/0193272 | A1* | 8/2006 | Chou et al. .................. 370/310 |
| 2007/0025313 | A1* | 2/2007 | Bhagwat et al. ............ 370/338 |
| 2007/0121656 | A1* | 5/2007 | Heidari-Bateni et al. .... 370/402 |
| 2008/0070642 | A1* | 3/2008 | Wang et al. ................. 455/574 |

FOREIGN PATENT DOCUMENTS

| EP | 1684467 A1 | 7/2006 |
| WO | WO 2004/021592 A1 | 3/2004 |
| WO | WO 2005/011204 A2 | 2/2005 |

* cited by examiner

*Primary Examiner*—Huy Phan
(74) *Attorney, Agent, or Firm*—McCarthy Tétrault LLP

(57) ABSTRACT

The invention relates to a system and a method for selectively reducing power consumption of a communication device communicating with a network. In the method, it comprises the following steps: de-activating at least one communication subsystem of the device during intervals when the device is placed in a power save mode; and while the device is in the power save mode the method re-activates the subsystem in two instances. For the first instance, the communication subsystem is re-activated in relation to a first connection condition, and is then de-activated after a first event. For the second instance, the subsystem is re-activated in relation to a second connection condition and is then de-activated after a second event.

19 Claims, 5 Drawing Sheets

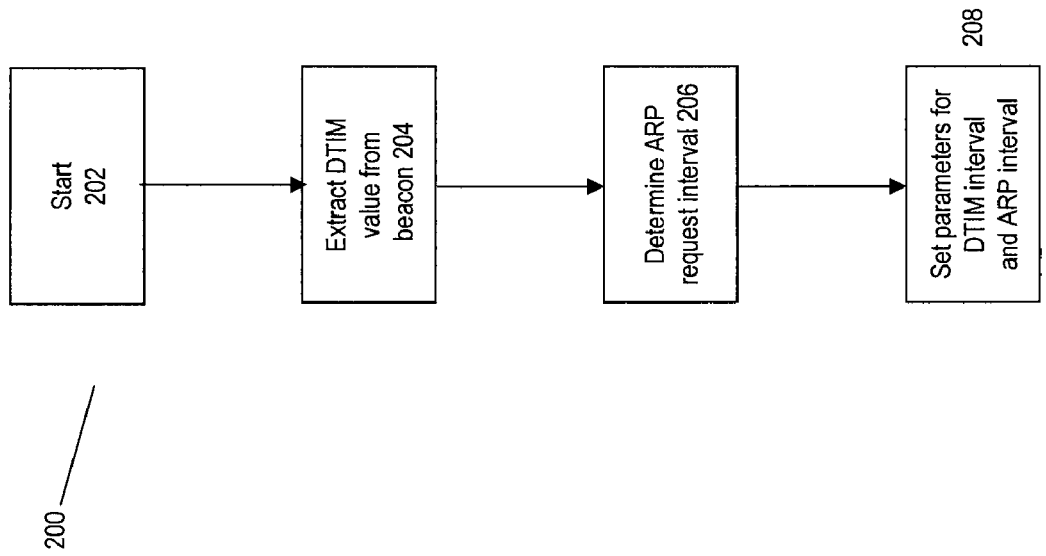

SYSTEM AND METHOD FOR CONSERVING POWER FOR A WIRELESS DEVICE WHILE MAINTAINING A CONNECTION TO A NETWORK

The invention described herein relates to a system and method for conserving power for a wireless device through a power save mode while maintaining more than one aspect of a network connection for the device. In particular, the power save mode may selectively activate the device to periodically receive and respond to certain data link signals, such as beacon signals, from a wireless network and to periodically receive and respond to protocol requests relating to a connection protocol, such as Internet Protocol (IP), that is used to transmit its traffic over the network.

BACKGROUND

Wireless handheld mobile communication devices perform a variety of functions to enable mobile users to stay organized and in contact with others in a communication network through e-mail, schedulers and address books.

As wireless devices are portable, they connect and communicate with several different wireless communication networks as they roam. As a wireless device roams, it periodically scans to determine if it is in communication range of one of the target networks. Such scans expend power on the device, thereby depleting its battery. Current wireless devices can be placed in a power saving mode where communications to the connected wireless network are minimized.

Typical communications between a device and a network are managed through a set of layered communication protocols for network communications, such as the Open Systems Interconnection (OSI)-connection layers. For a network connection following such layered protocols, different layers may impose different communication signalling requirements on the device. Each requirement for each layer may need to be adhered to by the device if the overall network connection is to be maintained. Prior art power save modes focus strictly on maintaining one layer of a protocol of a network connection, such as the data link connection, thereby leaving open the possibility of ignoring the requirements of other layers and losing the connection.

There is a need for a system and method which addresses deficiencies in the prior art.

BRIEF DESCRIPTION OF THE DRAWINGS

Embodiments of the invention will now be described, by way of example only, with reference to the accompanying drawings, in which:

FIG. 2A is a flowchart of exemplary steps executed by the device of FIG. 1 in determining timing parameters for a power save mode according to an embodiment;

DETAILED DESCRIPTION OF AN EMBODIMENT

Figure 1:
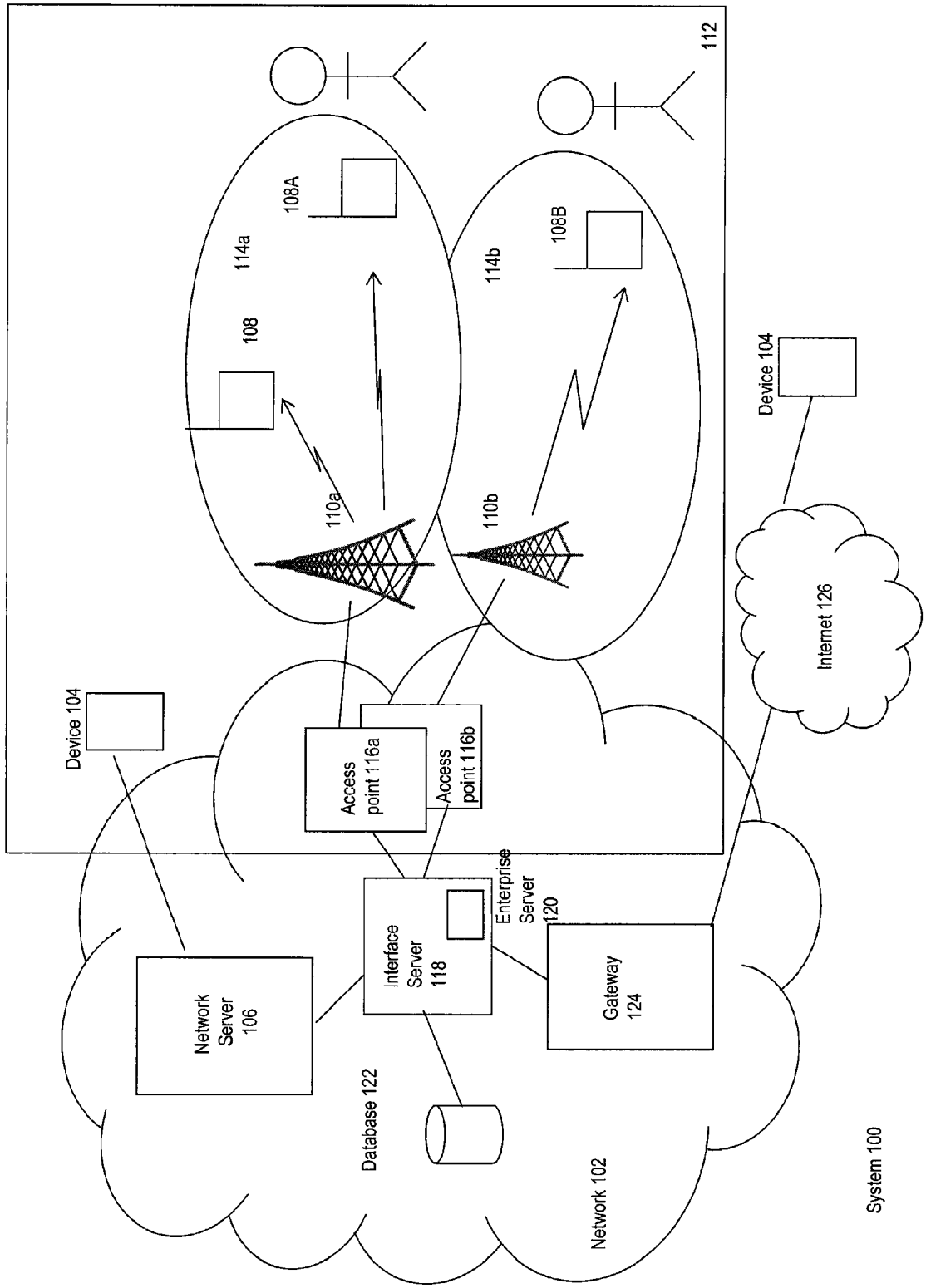
FIG. 1 is a schematic diagram of a communication network having a plurality of wireless networks therein that can communicate with a wireless electronic communication device having a power save mode as provided in an embodiment.

The description which follows and the embodiments described therein are provided by way of illustration of an example or examples of particular embodiments of the principles of the present disclosure. These examples are provided for the purposes of explanation and not limitation of those principles and of the invention. In the description which follows, like parts are marked throughout the specification and the drawings with the same respective reference numerals.

In a first aspect, a method for selectively reducing power consumption of a communication device communicating with a network is provided. The method comprises de-activating at least one communication subsystem of the device during intervals when it is placed in a power save mode; and re-activating the subsystem for two periods of time. For the first period beginning at a first instance, the method re-activates the subsystem, executes a first action relating to a first connection condition for the network, and then de-activates the subsystem. For the second period beginning at a second instance, the method re-activates the subsystem, executes a second action relating to a second connection condition for the network, and then de-activates the subsystem.

For the method, the network may be a wireless network; the first connection condition may be a data link layer connection condition for the network; and the second connection condition may be a network layer connection condition.

For the method, the network may also be a 802.11-class network; the first connection condition may also be to monitor for receipt of a MAC beacon signal; and the second connection condition may also be to monitor for receipt of an ARP request for an IP address.

In the method, the second event may be generation and transmission by the communication subsystem of a response to the ARP to the network.

In the method, the network may also be a 802.11-class network; the first period may be timed to allow the device to receive a MAC beacon signal; and the second period may be set to relate to a frequency of transmission of an ARP request for an IP address for said device.

In the method, the second action may be to generate and transmit a unicast frame to a host in said network by said device.

In the method, if the beacon signal indicates broadcast or multicast traffic from the network intended for the device follows the beacon signal, the first period may end after transmission of the broadcast or multicast traffic.

In the method, if the beacon signal indicates that no broadcast or multicast traffic from the network intended for the device follows the beacon signal, the first period may end after receipt of the beacon signal.

In the method, the power save mode may be repeated on a cycle that has two frequencies. A first frequency may be based on a frequency of occurrence of the first condition and a second frequency may be based on a frequency of occurrence of the second condition.

In the method, the first frequency may be determined from a DTIM value in the beacon.

In the method, if the DTIM value equals 1, then for the first period, the communication subsystem may be re-activated to receive and process every third signal of the beacon signal.

In the method, for the second instance, the second frequency of occurrence may be determined by finding an average cycle for transmission of successive ARP requests by timing a series of ARP requests and calculating the average cycle.

In the method, the second action may further comprise transmitting a unicast frame to other hosts listed in an ARP cache of said device.

In a second aspect, a communication device having a power save mode is provided. The device comprises: at least one communication subsystem providing transmission and reception of signals with a communication network; a microprocessor; a timer; a first module to selectively activate and de-activate the communication subsystem when the device is operating in the power save mode; and a second module to control the first module and the at least one communication subsystem while the device is in the power save mode. The second module operates such that the power save mode is programmed to activate the device in during two periods of time at two different instances. For first period, the module: initiates the first module to re-activate the subsystem at a first instance, then executes a first action relating to a first connection condition for the network, and then de-activates the subsystem. For the second period, the second module: initiates the first module to re-activate the subsystem at a second instance, then executes a second action relating to a second connection condition for the network, and then de-activates the subsystem.

For the device, the network may be a wireless network; the first connection condition may be a data link layer connection requirement for the network; and the second connection condition may be a network layer connection requirement for the network.

For the device, the network may also be a 802.11-class network; the first connection condition may also be to monitor for receipt of a MAC beacon signal; and the second connection condition may also be to monitor for receipt of an Address Resolution Protocol (ARP) request for an Internet Protocol (IP) address.

In the device the second event may be transmission of a response to the ARP to the network.

In the device, if the beacon signal indicates broadcast or multicast traffic from the network intended for the device follows the beacon signal, the first time period may end after transmission of the broadcast or multicast traffic. Further, if the beacon signal indicates that no broadcast or multicast traffic from the network intended for the device follows the beacon signal, the first period may end after receipt of the beacon signal.

In the device, the power save mode may be repeated on a cycle that is based on a first frequency of occurrence of the first condition and a second frequency of occurrence of the second condition.

In the device, the first frequency of occurrence may be determined from a DTIM value in the beacon.

In the device, if the DTIM value equals 1, then for the first period, the communication subsystem may be re-activated to receive and process every third signal of the beacon signal.

In the device, the second action may further comprise transmitting a unicast frame to other hosts listed in an ARP cache of said device.

In the device, for the second period, the second frequency of occurrence may be set to be shorter than the frequency of transmission of the ARP.

In other aspects, various combinations of sets and subsets of the above aspects are provided.

Exemplary details of embodiments are provided herein. Briefly an embodiment provides a method and system to selectively provide low power mode for a communication device. When the low power mode is activated, a power save mode for the device is asserted, where certain components are temporarily de-activated, such as components and modules relating to communication subsystems for the device. Parameters that determine the length and frequency of the power save mode are determined from connection requirements for the device. The connection requirements can relate to requirements for different layers of an underlying connection model for the network and its traffic.

First, a description is provided on general concepts and features of a network that communicates with a device according to an embodiment, including related network connection requirements for the device. Next, further detail is provided on a power save mode according to an embodiment and its algorithms that accommodate the connection requirements for the device. Then, further detail is provided on an exemplary wireless device related to an embodiment.

Referring to FIG. 1, details on an exemplary network and communication device having a power save mode according to an embodiment are provided. FIG. 1 shows communication system 100 where network 102 provides a suite of applications, services and data to its connected devices 104 through its associated servers. Devices 104 connect to network 102 through wired connections to network server 106 which have software and hardware facilities to manage all communications of data and messages among devices communicating in network 102. Network 102 can be implemented in any known architecture, providing wired and/or wireless connections to its elements.

As part of a typical network architecture elements in system 100 are organized following a layered model of network functions, such as an OSI model. As is known in the art, the OSI model defines seven layers where each layer controls functions of specific network/connection/applications.

Two OSI layers of particular relevance for an embodiment are the network layer and the data link layer. Adherence to all necessary connectivity requirements for each layer is required if device 108 is to remain in communication with all relevant networks in system 100. Features of both layers are discussed in turn.

For the data link layer, further detail is provided on an exemplary installation for network 110 relating to an embodiment. Network 110 is implemented as Wireless Fidelity (Wi-Fi) networks generally following standards set by the IEEE LAN/MAN Standards Committee, known as IEEE 802, through its working group "11". The 802.11 standard defines media access control (MAC) and physical (PHY) layers in the OSI protocol model for WLAN. Such standards are known to those of skill in the art. Administrative functions for network 110 may be provided by software controlling it. The software may administer functions such as network identification and network access parameters. The initial 802.11 standard was followed with a series of amendments, where each amendment was identified by an alphabetic suffix following in the standard's numeric identifier "802.11". The family of 802.11 amendments is sometimes referred to as the 802.11x family. Currently, the 802.11 amendments encompass six wireless modulation techniques that all use the same communication protocol among their communicating elements. Such networks are deployed in one or more of the five current versions of 802.11: 802.11a, b, g and n. These amendments include changes to the IEEE 802.11 PHY. There are other MAC layer amendments that are known to those of skill in the art. Specific transmission details and parameters of these networks are known to those of skill in the art.

For the data link layer, wireless devices 108 communicate with each other through wireless networks 110. In many environments, networks 110 are local, geographically small, wireless networks (such as wireless local area networks or WLANs), perhaps being contained within a single building 112. Wireless devices 108 include handheld devices, cell phones and computers (either desktop or portable) having a (wireless) network card, network adapter and/or network interface controller (NIC) installed therein. There may be one or more networks 110 at a particular site and the geographic coverage 114 of each network 110 may overlap fully, partially or not at all.

Network 110 includes an antenna, access point (AP) 116 and supporting radio transmission equipment known to those skilled in the art. In an embodiment, each AP 116 is an IEEE 802.11 radio receiver/transmitter (or transceiver) and functions as a bridge between its respective WLAN 110 and network 102. For security, each AP 116 may be communicatively coupled to network 102 through a respective firewall and/or VPN (not shown). It provides data distribution services among devices 108 within network 110 and between devices 108 in network 110 and other devices in other connected networks. One distribution service provided by access point 116 for its related stations is to establish a logical connection between a device 108 and an access point.

Interface server 118 in network 102 provides hardware and software systems to allow network 102 to communicate with wireless networks 110. For communications directed to wireless devices 108, wireless services enterprise server 120 provides an interface with server 106 for transmissions destined to devices 108 and vice versa.

Database 122 provides a data storage system for one or more elements in network 102, including server 106. Security systems within network 102 can be provided by known techniques and systems. Gateway 124 provides and monitors selected communications between elements in network 102 and external devices connected through Internet 126.

For a 802.11 network, a "station" is a basic component in the network. A station is any device that implements the functionality of a 802.11 protocol and has a connection to the wireless network. Typically, the 802.11 connection and communication functions are implemented in hardware and software and may be provided in a network connection circuit or system in a NIC at the station. A station may be any device, including a laptop computer, handheld device 108, or an AP 116. Stations may be mobile, portable, or stationary. All stations support the 802.11 station services of authentication, de-authentication, privacy, and data delivery. For the purposes of an embodiment as it relates to 802.11 standards, devices 108 may be considered to be stations.

A service set identifier ("SSID") is a unique 32-character network name, or identifier, that is created and associated with a particular WLAN 110. The SSID can be any alphanumeric entry up to a maximum of 32 characters and is typically case sensitive. It may be set by a network administrator using network administration software for a control server of WLAN 110. The SSID should be chosen so that it differentiates one WLAN from another. As the SSID differentiates one WLAN from another, any APs and all wireless and other devices attempting to connect to a specific WLAN may require that a device provides the correct SSID for that WLAN before permitted the device to join that WLAN.

Further detail is now provided on messages generated and sent between components in WLAN 110. In a 802.11-compliant network, messages are sent between its AP 116 and its communicating devices 108 in data transmissions called frames. Most frames are sent and processed in a "send-and-respond" protocol. As such a frame may be sent by an AP 116 to one or more devices 108. When a device receives a frame, it extracts data from the frame and then it may generate a response. A similar communication dialog may be initiated by a device 108 to AP 116. Note that broadcast frames sent by an AP 116 are not acknowledged by stations 108. There are several classes of frames including control, management and data. Control frames assist in delivering data frames between stations. Management frames facilitate connection establishment and maintenance between a device 108 and AP 116. In particular, management frames have the following uses: they allow a device to be associated, disassociated and re-associated to a network; they allow a device to be authenticated with a network; and they allow a device to initiate a probe request to an AP to request information about another device in a network. Frames may include additional information such as source and destination MAC addresses, a control field that provides information on the 802.11 protocol version, frame type and other status indicators. It will be appreciated that a person of skill in the art has knowledge of the protocols of the frames. Additional materials relating to same are provided in published 802.11 Working Group materials.

A beacon frame is a type of a management frame that is periodically broadcast by an AP 116 to provide a signal of its presence to the communication boundaries of its network. The typical period of transmission of a beacon frame is about every 100 ms. 802.11 standards set the period to be exactly 102.4 ms. It will be appreciated that there will be an acceptable variance in the exact period used in an embodiment, which may be in the range of 10% from the standard period. The body of a beacon frame contains: a beacon interval, providing the amount of time between beacon transmissions; a timestamp, which may be used by a station to synchronize itself and update its local clock; and the SSID of the WLAN 110 of the AP 116. The beacon frame can also provide: data indicating the supported transmission rates of the WLAN; data regarding the signalling parameters of the WLAN, such as frequency hopping spread spectrum, direct sequence spread spectrum, etc.; data on the capabilities of the WLAN; and data providing a traffic indication map (TIM). The beacon frame includes a frame header and cyclic redundancy checking (CRC) field. The destination address of the frame is set to all 1's, which is the broadcast MAC address. This will cause all other stations on the applicable channel to process a received beacon frame. The beacon frame may also contain a Delivery TIM (DTIM) which is a flag indicating whether any buffered broadcast or multicast traffic is going to be transmitted from the AP 116 to device 108 immediately (or shortly) after the beacon signal.

Table A below provides a snapshot of some of the typical fields in a beacon frame:

TABLE A

| Field | Exemplary Value |
|---|---|
| Timestamp | 3403424 microseconds |
| Beacon Interval | 100 ms |
| SSID ID | 0 |
| TIM | |
| Element ID | 5 |
| TIM element | |
| Length | 6 |
| DTIM Period | 0 |
| Bit Offset Map | 1 |
| Traffic Indicator | 0 |

The last four parameters are all related to the TIM element.

A beacon frame is used as a synchronizing signal for transmitting broadcast and multicast traffic to devices in the associated network. Immediately following the beacon frame, if broadcast or multicast traffic is queued to be provided, such traffic is transmitted by AP 116 through its network 112. Multicast traffic is queued for transmission by AP 116 only if its requested recipient device 108 has positively responded to an early request by AP 116 to transmit that multicast traffic to it. Broadcast traffic is broadcast to the devices 108 without any request signal sent by AP 116. The broadcast or multicast traffic can contain data from other layers in the communication network, such as the IP layer. The contents of the Bit Offset Map and the Traffic indicator combined contain an encoded indication of what type of traffic (i.e. broadcast or multicast) follows the beacon, if any. Device 108 has an algorithm that can decode the fields to determine if any such traffic does follow the beacon signal.

Further detail is now provided on how a device 108 interacts with AP 116 when entering the coverage area of network 110. Each device 108 that enters a coverage area 114 needs to become associated with the related AP 116 before a communication connection is made to network 110. Once an association is made, AP 116 is able to use identification data relating to device 108 to determine where and how to deliver data to that device 108. As a device 108 roams into the coverage area 114, it periodically scans for any beacon signals on some or all channels on one or more classes of 802.11 network(s). When a beacon is found, the device extracts data parameters of particular network. Once the data is extracted, device 108 can analyze the data and adjust parameters of the power save mode accordingly.

Additional connection information may then be established for other requirements of other connection layers in the OSI model. For example, in addition to providing a data link layer connection between device 108 and AP 116, following the OSI-model, network 112 is configured to process IP traffic among device 108, AP 116 and other components in network 102. In order for device 108 to receive IP traffic, it must maintain an IP connection for device 108 through WLAN 110.

For the IP connection between device 108 and WLAN 110, in to establish and maintain an IP connection with WLAN 110, device 108 needs to acquire an Internet Protocol (IP) address. IP addresses are either static or dynamic. Dynamic IP addressing allows device 108 to move and maintain or re-establish a connection to the Internet and receive IP traffic. As part of this mobility, WLAN 10 implements a Dynamic Host Configuration Protocol (DHCP) server to server to dynamically allocate a temporary IP address to device 108.

While the MAC address for the device 108 does not change, network 110 needs to be able to pair a MAC address with the IP address for device 108. Network 110 establishes this pairing utilizing the Address Resolution Protocol (ARP) (RFC 826), whose parameters are known in the art. ARP provides for an IP host to establish a mapping between the MAC and an IP address for device 108. Each device is expected to respond to an ARP request within a given timeframe. Timely receipt of the response enables the network to confirm the connection with the device and as such the network can maintain the connection particulars for the device. As part of the protocol, an AP may learn and store the IP/MAC address for a specific device 108. In order to adhere to ARP, device 108 must provide a timely response to the ARP request. Any IP unicast frame and Internet Control Message Protocol (ICMP) request (ping) sent from device 108 to the IP gateway associated with the WLAN 110 through AP 116 will trigger the IP gateway to update its ARP table. Any timely ARP response messages that are received by AP 116 are provided to the IP gateway associated with WLAN 110. The network gateway or router will periodically update its ARP cache. When the ARP cache entry expires, the device can trigger the gateway to update its ARP cache by sending it a directed frame. Use of an ICMP request or ping frame is a logical choice because the gateway will need to do an ARP in order to reply.

Network 110 stores newly-learned MAC/IP pairs in a local cache. Similarly, AP 116 may maintain a copy of the cache, which may be periodically flushed and reconciled; this is known as proxy ARP behaviour. In order for device 108 to maintain its IP connection with network 110, it is necessary that AP 116 and network 110 have data for a MAC/IP pair for device 108. As such, device 108 needs to be able to provide a timely response to any ARP requests generated by AP 116. For example, AP 116 may send a ARP request message to each device 108 in its ARP cache. When a particular request is sent to a particular device 108, if that device 108 does not provide a timely ARP response to AP 116, then the entry for that device in the ARP cache of the AP is subject to being deleted. Thereafter, the deleted device will not receive any IP traffic that is addressed to it. Similarly, device 108 maintains an ARP cache of hosts that have tried to contact it.

Different periods may be provided for ARP requests for different networks. The periods may be static or dynamic. The windows for receiving responses may be static or dynamic as well. Generally, a typical frequency of sending ARP requests is in the range of minutes, such as once every 4 to 10 minutes.

In the above noted network, an embodiment provides a power save mode for a device while maintaining connection requirements of different functional layers of the network's connection model. One feature of such a power save mode that it selectively turns off power to one or more modules of its associated device. In device 108, its communication subsystems consume a significant amount battery power (see elements 404 and 406 in FIG. 4). As such, it is useful to minimize activation of those modules during a power save mode. However, it will be appreciated that during such power save times, no data traffic can be transmitted or received. As such, those modules are selectively powered down, but then selectively re-activated for defined periods of time in order to receive and respond to various network connection requests relating to different functions in an OSI model. As described earlier, two important functions in a network implementing an OSI model are the maintenance of the data link connection and the network connection, namely an 802.11 connection and an IP connection for the network described above. In order to maximize the power savings, it is preferable to set a power save period that lasts as long as possible, without losing either connection.

As noted earlier, as part of the data link layer, AP 116 will periodically send broadcast/multicast packets towards device 108 at intervals determined, in part, by the value of the DTIM field (see Table A, earlier). As such, for the power-down mode for device 108, it must be synchronized such that device 108 is able to receive and respond to such beacon signals and receive, as required, the broadcast/multicast traffic that proceeds them.

In an embodiment, the power save mode does not have to re-activate device 108 for each and every data link beacon. The DTIM field contains an integer value indicating the frequency of the broadcast/multicast downloads relative to the beacon signal. When there is a station (such as device 108) in power save mode, AP 116 will delay transmission of broadcast frames until after the beacon with the DTIM. That gives the sleeping stations an opportunity to receive the beacon. The value of the DTIM should not be too large because that may cause unacceptable delays in broadcast traffic. It will also be appreciated that there may be incremental gains in battery life diminishes as the DTIM increases.

There is also a tradeoff between battery life savings and WLAN broadcast delays. As a balance in the trade-off, the DTIM should be set to a value of 2, 3, 4 or around that range. If it is set to "1" nominally, this indicates that network 110 is set to be able to provide a broadcast/multicast transfer after each beacon signal. If the DTIM field is set to 2, 3, 4, etc. then broadcast/multicast traffic is set to sent after every second, third, fourth etc. beacon signal. Notably, for a Wi-Fi network carrying IP traffic, even if the DTIM field is 1, there is a high degree of certainty that there will not be multicast/broadcast IP traffic of interest to the device 108 provided after each beacon signal. Similarly, if the DTIM field is 2, there is also a good probability that there will not be IP traffic of interest to the device 108 provided after every second beacon signal. Using the above noted discoveries, it is possible to have a power-down mode for an embodiment, maintain its power save mode for longer than 1 or 2 beacon intervals and still maintain a data link connection. It is important to note that there may be a unicast traffic indication within any specific beacon. However, unlike broadcast traffic, AP 116 buffers the unicast frames for the station until the station requests that these frames are to be forwarded. Thus, if device 108 maintains a power save mode for longer than 1 or 2 beacon intervals, it will still be able to receive unicast traffic.

As such, in order to maintain a data link connection and to extend the duration of the power save mode, device 108 can receive and read the DTIM value from the beacon and then adjust the duration of the power save mode accordingly. In the embodiment, if the DTIM value in the beacon is 1, then the duration of the power save mode is set to 3 beacon intervals (i.e. 3×102.4 ms=307.2 ms). For any other value (i.e. DTIM>=2), the power save duration is set to that value of the DTIM. In other embodiments, different timing intervals may be used to respect specific timing requirements for a particular data link connection. It will be appreciated that if the interval is too large (for example "9"), then there will be unacceptable delays or losses in the transmission of broadcast/multicast traffic to all devices connected to the AP.

As such, when the power save mode re-activates the communication subsystems of device 108, device 108 can then receive the beacon signal, analyse the data in the beacon signal to determine whether multicast/broadcast traffic is to follow the beacon signal and then, wait if necessary to receive the data. If no data is to be received, then the device can return to its power save mode until the next re-activation cycle or event. If data is to be retrieved, then device 108 may keep the communication subsystems active for the duration of the transmissions in order to receive and confirm same, as needed.

As the DTIM value indicates a de-activation period, the duration of the activation and deactivation periods need to be monitored. An internal clock in device 108 is used to track the elapsed time for the power save mode. In order to ensure that the power save mode should not extend over the estimated time of the next beacon signal. As such, the power save time can be adjusted slightly downward to allow for the device to re-activate its communication subsystems to be available to receive the next expected beacon. For example, if the power save interval is 307.2 ms (or a value near that amount) because the DTIM value is 1, then the mathematical time between re-activation for beacon signals is 307.2 ms. However, the actual duration may be 290 ms or some other value that is offset below 307.2 ms. If there is no broadcast traffic, device 108 will go back to its power save mode after the beacon, which would be in the order of 5 ms. If there is broadcast traffic, the device will stay awake for 10-20 ms, or any other time that enables device 108 to receive that traffic. Alternatively or additionally, it may return to its power save mode upon receiving a signal indicating that transmission of the traffic has completed. It will be appreciated that in other embodiments, other multipliers and offsets may be used to set the duration of the power save mode.

As noted above, the connection between device 108 and network 102 requires both a data link connection and an IP connection. The above noted re-activation frequency for the power save mode ensures that the data link connection is maintained. However, the embodiment adjusts the power save mode to re-activate device 108 to enable it to respond to specific IP-layer requests related to the IP connection to ensure that the IP connection is maintained.

Accordingly, the power save mode needs to be responsive to certain connection requirements and IP connection messages sent from AP 116 to device 108. As noted above, AP 116 periodically broadcasts ARP signal requests to its network. Device 108 preferably responds to each ARP request in order to maintain the IP connection for device 108, even when device 108 is in a power save mode. Notably, responding to ARP request does not require that device 108 be fully active for the entire period between ARP requests. As such, the power save mode is designed to activate the communication subsystems of device 108 in order to enable it to receive and respond to each ARP request that requires a response. After transmitting an appropriate response, the power save mode may selectively de-activate the communication subsystems until they are required, they are activated or the next re-activation cycle for the power save mode is reached. The next re-activation cycle may be the next predetermined wakeup time arrives for a subsequent beacon (which may not necessarily be the next beacon). In some configurations, if the ARP request is set to be sent more frequently than the beacons, then the next interval that device 108 will be able to receive and respond to ARP requests would be the next re-activation time.

In order to establish the period of time between successive ARP requests for the power save mode, device 108 may need to conduct a discovery process to determine the ARP timeout period for a host. This may be done by initially monitoring for 2 or more ARP requests from the host and determine an average time between ARP requests. Using its internal timer, it can then wake itself up at an appropriate time to receive and respond to the ARP requests. In some embodiments, device 108 may set the time such that it simply expects the ARP request to be set at a specific time and then generates and sends the response. As such, device 108 may generate an ARP when it has determined that an ARP request is being, just has been, or is about to be sent and then it re-enters its power save mode. This may be done by device 108 when it makes a new association with a new wireless network 112.

It is noted that the discovery process to determine an ARP timeout period for a particular host may need to be repeated for other hosts in the network, as different hosts may have different timeout periods. This may not be feasible. As such, the discovery may be conducted for the default gateway of the network. Alternatively or additionally, another approach may perform the discovery process on all hosts with which device 108 has communicated with in the network (and that have entries in its own ARP table).

Other embodiments may implement different timing and synchronization methods. One approach is as follows. When device 108 is timed to re-activate itself for the ARP, it may generate and send a unicast frame to the other device from which it is expecting an ARP request (such as AP 116). This approach does not need to consider any ARP request and related synchronizations to the request. In this approach, device 108 should preferably maintain power to its communication systems for a short period after sending the proactive unicast packet, just in case the other device actually sends an ARP request (which must be honoured by device 108). Device 108 may also scan its cache and send a unicast frame to all hosts in the cache.

It will be appreciated that an embodiment may not require establishment of the time between successive ARP requests to operate. Alternatively, an embodiment may use a preset time between ARP requests, such as 120 seconds. Preferably, the preset time is set such that no host in the network has an ARP timeout below that preset time.

With the embodiment both the data link and the IP connections are maintained. Gratuitous ARP responses are also avoided, thereby minimizing the possibilities of having the network misinterpret the ARP responses as being a "Denial of Service" attack.

In other embodiments, the parameters may vary on other connection conditions of the device or in the network, such as battery strength, signal strength, etc.

Referring to FIG. 2A, flow chart 200 shows a process operating on device 108 used to determine set timing parameters for the power save period. First at step 202, process 200 starts. At step 204, process 200 receives and extracts DTIM parameters from a beacon signal. At step 206, an average ARP period is determined from monitoring and timing successive ARP requests. At step 208, a power save time is determined such that device 108 is re-activated at each prescribed DTIM power save interval and at each ARP request interval. The re-activation times are tracked by an internal clock, representing first and second instances when device 108 awakens from its power save mode. After each instance of being re-awakened, device 108 may conduct a further action, depending on the context for re-awakening, in order to maintain an aspect of a connection to its network. When the system is implemented in a 802.11 network, monitoring of signals and initiation of commands may follow the functional requirement of 802.11 frames as noted earlier.

It will be appreciated that other embodiments may have the elements of process 200 in different orders or may have more or less steps and tests therein. Process 200 may be atomized and may be executed by one or more evaluation, monitoring and command initiation processes operating on device 108. Also, process 200 may operate in the background on device 108.

Figure 2B:
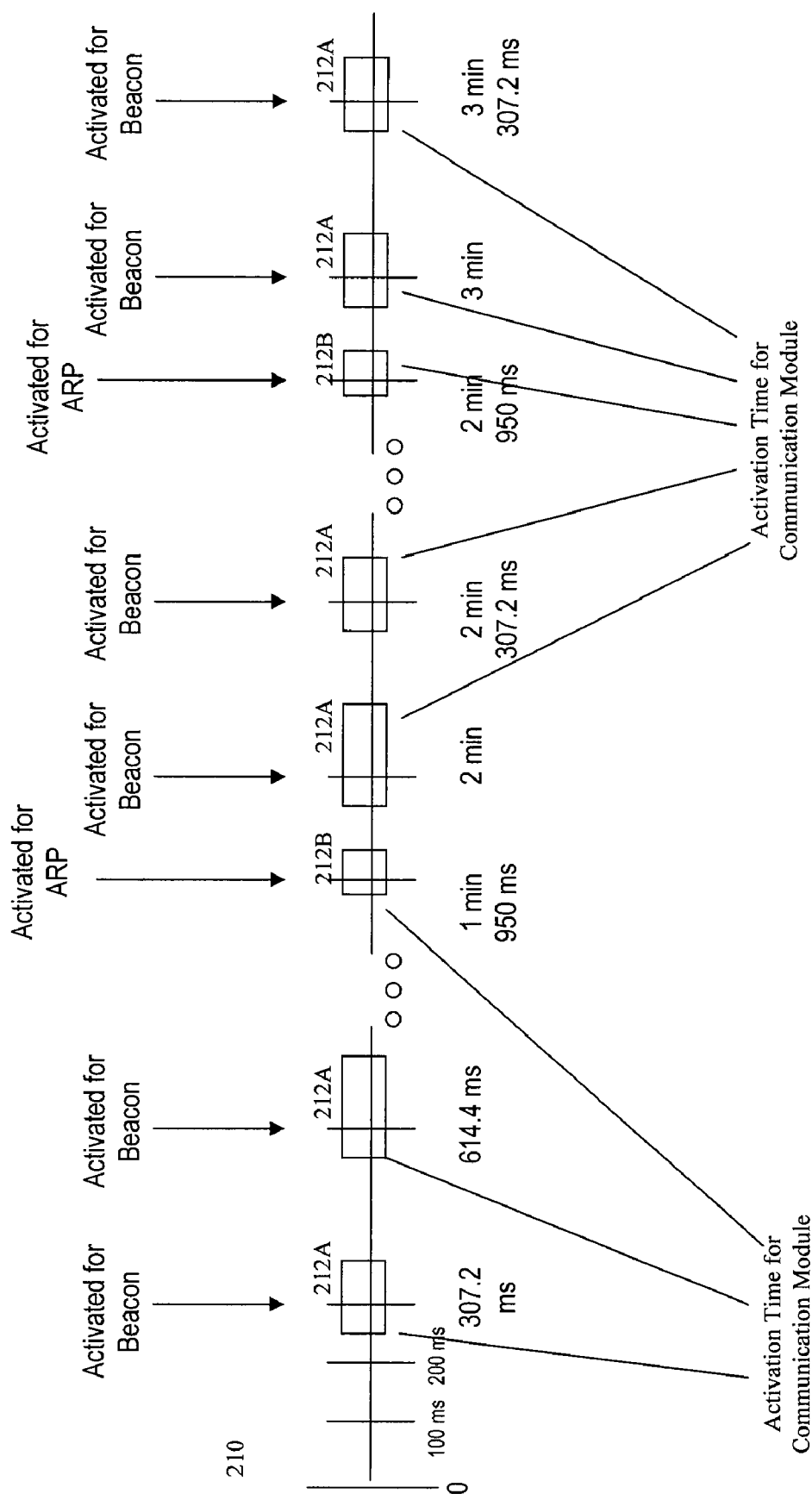
FIG. 2B is a timeline of activation and deactivation periods for the device of FIG. 1 when operating in a power save mode according to an embodiment.

Referring to FIG. 2B, timeline 210 shows an exemplary timeline of activations of the communication subsystems 404 and 406 according to an embodiment. To begin, it is presumed that the DTIM value in the beacon signal is set to 1, thereby initiating an activation frequency of once every 307.2 ms (3×102.4 ms) to capture each third beacon signal. It is also presumed that device 108 has already monitored and determined the frequency of transmission of the ARP request signals and it has determined that they are sent once every 2 minutes, but that they are also offset such that they are sent 50 ms prior to each round minute mark (e.g. 1 minute and 950 ms, 2 minutes and 950 ms, etc.). Note that at the 102.4 ms and 204.8 ms intervals, beacon signals would be expected to be received, but the communication subsystems would not be activated to allow device 108 to process them. Windows 208 illustrate periods of activation of the communication modules during the power save mode. It can be seen that each period of activation of device 108, has each window 208 being activated slightly before the expected receipt of the related beacon or ARP signal. The duration of the window may depend on the requirements for processing relevant communications for a particular beacon or ARP. The windows may overlap. If such overlapping occurs, then it may not be necessary to re-activate the device if it has already been re-activated. During each window device 108 may execute a specific action depending on whether the window was meant to maintain an aspect of a data link layer connection requirement or a network layer connection requirement for the network. As an ARP response may take less time to generate and send, window 208B for processing an ARP request is shorter that window 208A for processing a beacon. It is noted that an ARP response generally has to go through the WLAN driver higher into the stack of the AP 116. After some beacons, there may be broadcast or multicast traffic, so each window 208A may differ in length from other windows 208A.

To assist with management of a power mode's re-activation arrangements, a software application referred to herein as a power save management module may be provided in device 108. Management of input and display of the power save parameters may be provided through a graphical user interface (GUI) as part of that module. In the GUI, screen may be provided implementing selection and activation criteria for one or more power save modes may be provided using the parameters described herein. Once the parameters for the power save modes are entered, other processes and systems on device 108 may monitor for various conditions relating to the status of all various levels of connections for a network and then compare the connections against the activation conditions set in the power save management system. If an activation condition is satisfied, the other processes can recognize this state and then proceed to selectively activate and de-activate one or more modules for a power save mode.

Figure 3:
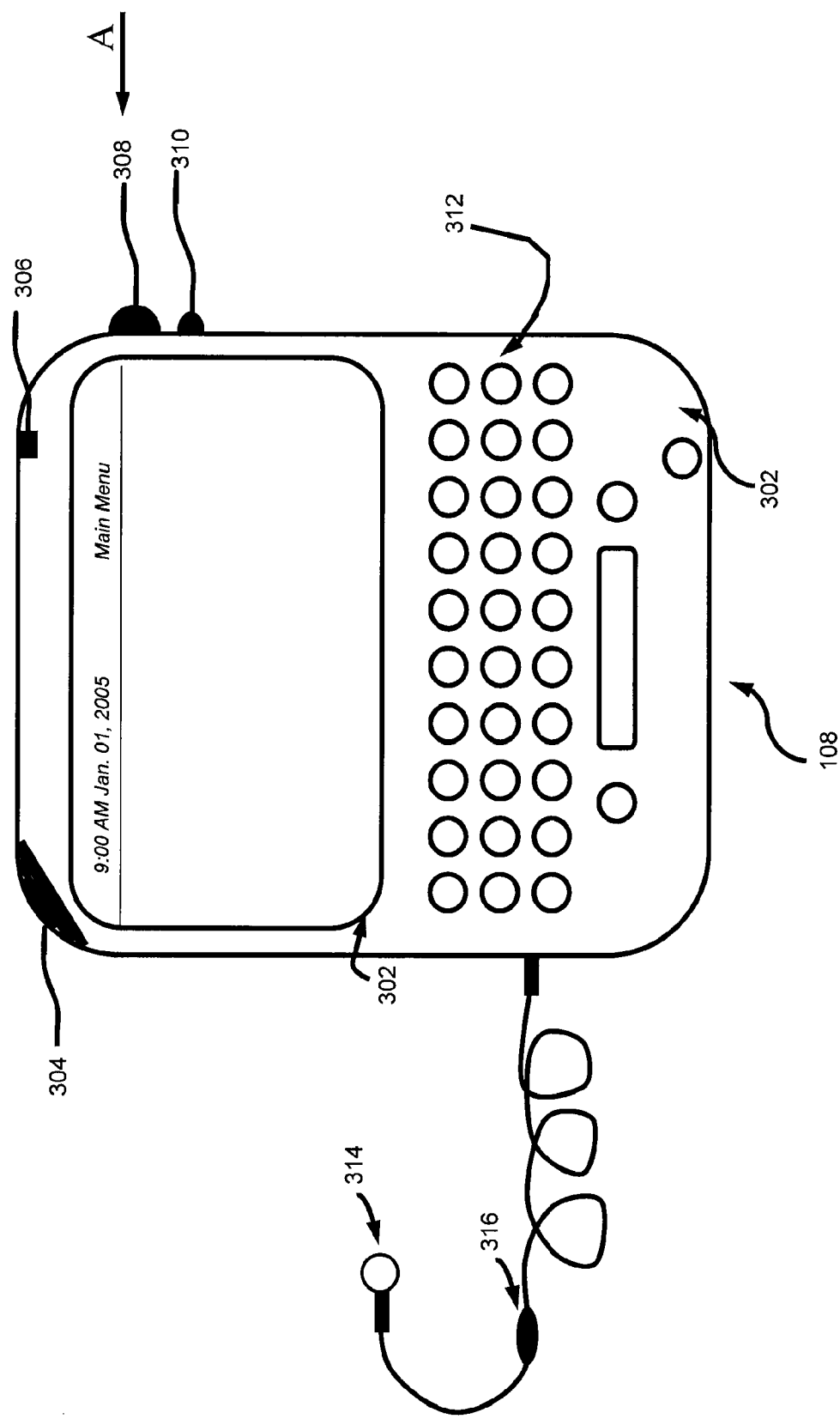
FIG. 3 is a schematic representation of the device of FIG. 1 having a power save mode in accordance with an embodiment.

FIG. 3 provides general features of an electronic device for processing electronic communications in accordance with an embodiment of the invention, which is indicated generally at 108. In the present embodiment, device 108 is based on a computing platform having functionality of an enhanced personal digital assistant with cellphone and e-mail features. It is, however, to be understood that device 108 can be based on construction design and functionality of other electronic devices, such as smart telephones, desktop computers, pagers or laptops having telephony equipment. In a present embodiment, electronic device 108 includes a housing 300, an LCD 302, speaker 304, an LED indicator 306, a trackball 308, an ESC ("escape") key 310, keypad 312, a telephone headset comprised of an ear bud 314 and a microphone 316. Trackball 308 and ESC key 310 can be inwardly depressed along the path of arrow "A" as a means to provide additional input to device 108.

It will be understood that housing 300 can be made from any suitable material as will occur to those of skill in the art and may be suitably formed to house and hold all components of device 108.

Device 108 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Wireless WAN (IMS), Wireless MAN (Wi-max or IEEE 802.16), Wireless LAN (IEEE 802.11), Wireless PAN (IEEE 802.15 and Bluetooth) etc. and any others that support voice. Additionally, a Bluetooth network may be supported. Other embodiments include Voice over IP (VoIP) type streaming data communications that can simulate circuit-switched phone calls. Ear bud 314 can be used to listen to phone calls and other sound messages and microphone 316 can be used to speak into and input sound messages to device 108.

Figure 4:
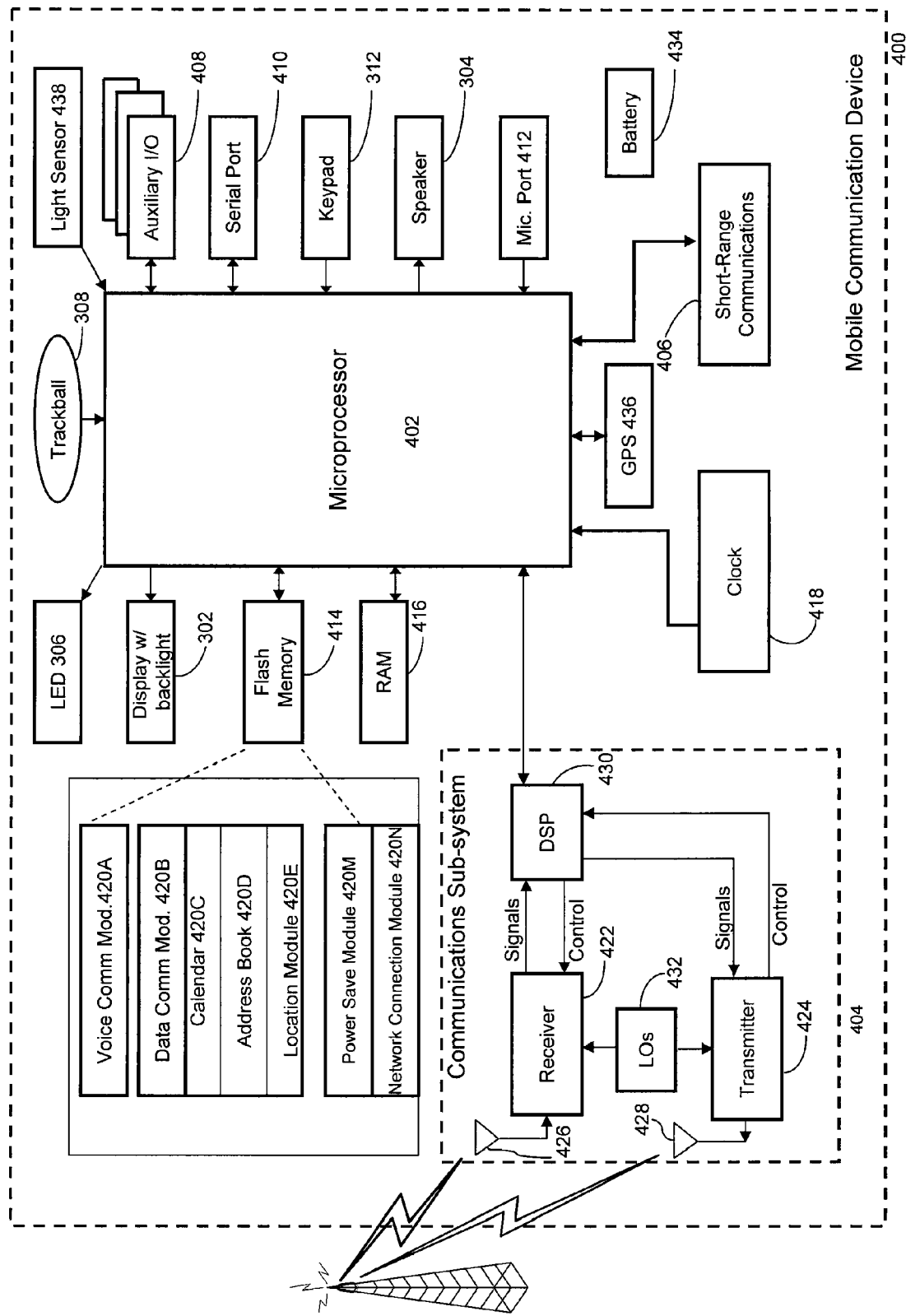
FIG. 4 is a block diagram of certain internal components of the device of FIG. 3.

Referring to FIG. 4, functional components of device 108 are provided in schematic 400. The functional components are generally electronic, structural or electro-mechanical devices. In particular, microprocessor 402 is provided to control and receive almost all data, transmissions, inputs and outputs related to device 108. Microprocessor 402 is shown schematically as coupled to keypad 312 and other internal devices. Microprocessor 402 preferably controls the overall operation of the device 108 and its components. Exemplary microprocessors for microprocessor 402 include microprocessors in the Data 950 (trade-mark) series, the 6200 series and the PXA900 series, all available at one time from Intel Corporation. Microprocessor 402 is connected to other elements in device 108 through a series of electrical connections to its various input and output pins. Microprocessor 402 has an IRQ input line which allows it to receive signals from various devices. Appropriate interrupt firmware is provided which receives and reacts to the signals detected on the IRQ line.

In addition to the microprocessor 402, other internal devices of the device 108 are shown schematically in FIG. 3. These include: display 302; speaker 304; keypad 312; communication sub-system 404; short-range communication sub-system 406; auxiliary I/O devices 408; serial port 410; microphone port 412 for microphone 316; flash memory 414 (which provides persistent storage of data); random access memory (RAM) 416; clock 418 and other device sub-systems (not shown). Device 108 is preferably a two-way radio frequency (RF) communication device having voice and data communication capabilities. In addition, device 108 preferably has the capability to communicate with other computer systems via the Internet.

Operating system software executed by the microprocessor 402 is preferably stored in a computer-readable medium, such as flash memory 414, but may be stored in other types of memory devices, such as read-only memory (ROM) or similar storage element. In addition, system software, specific device applications, or parts thereof, may be temporarily loaded into a volatile store, such as RAM 416. Communication signals received by the mobile device may also be stored to RAM 416.

In addition to an operating system operating on device 108, additional software modules 420 enable execution of software applications on device 108. A set of software (or firmware) applications, generally identified as applications 420, that control basic device operations, such as voice communication module 420 and data communication module 420B, may be installed on the device 108 during manufacture or downloaded thereafter. As well, other software modules are provided, such as calendar module 420C, address book 420D and location module 420E.

Power save management module 420M is software and/or firmware that provides processes to receive and update trigger conditions for a power save mode implemented by an embodiment. A series of GUIs are provided allowing the user to select, for example, the frequency at which beacon signals are monitored, the duration of any monitoring window and how the average for the ARP request period is set.

Network connection module (NCM) 420N is software and/or firmware that provides processes to detect and analyze when device 108 is in communication contact with one or more networks 110 and determine the parameters of each communicating network 110 both at the data link layer and the IP connection layer. It may also control when to seek a connection to a particular network and when to enter, activate, deactivate the power save mode described earlier. When NCM 420N is used to monitor 802.11x networks and issue commands relating thereto, the monitoring of signals and the initiation of commands may follow the functional requirement of 802.11 frames as noted earlier. NCM 420N also has the ability to selectively activate and deactivate parts of the components providing communication functions described below. In some embodiments, NCM 420N provides support for the IP stack and the communication (radio) drivers as well as their management. In other embodiments, NCM 420N provides support for the IP stack and the related radio drivers alone.

Additional modules such as personal information manager (PIM) application may be provided. Any module may be installed during manufacture or downloaded thereafter into device 108.

Data associated with each application, the status of one or more networks, profiles for networks and trigger conditions for commands for networks can be stored and updated in flash memory 414.

Communication functions, including data and voice communications, are performed through the communication sub-system 404 and the short-range communication sub-system 406. Collectively, sub-systems 404 and 406 provide the signal-level interface for all communication technologies processed by device 108. Various applications 420 provide the operational controls to further process and log the communications. Communication sub-system 404 includes receiver 422, transmitter 424 and one or more antennas, illustrated as receive antenna 426 and transmit antenna 428. In addition, communication sub-system 404 also includes processing modules, such as digital signal processor (DSP) 430 and local oscillators (LOs) 432. The specific design and implementation of communication sub-system 404 is dependent upon the communication network in which device 108 is intended to operate. For example, communication sub-system 404 of device 108 may operate with the Mobitex (trade-mark), DataTAC (trade-mark) or General Packet Radio Service (GPRS) mobile data communication networks and also operate with any of a variety of voice communication networks, such as 802.11 networks, Bluetooth networks, Advanced Mobile Phone Service (AMPS), Time Division Multiple Access (TDMA), Code Division Multiple Access (CDMA), CDMA 2000, Personal Communication Service (PCS), Global System for Mobile Communication (GSM), WWAN (cellular), WMAN (Wi-max), WLAN (WiFi), and WPAN (Bluetooth) in other disclosures, etc. Other types of data and voice (telephonic) networks, both separate and integrated, may also be utilized with device 108. In any event, communication sub-system 404 provides device 108 with the capability of communicating with other devices using various communication technologies, including instant messaging (IM) systems, text messaging (TM) systems and short message service (SMS) systems.

Short-range communication sub-system 406 enables communication between device 108 and other proximate systems or devices, which need not necessarily be similar devices. For example, the short-range communication sub-system may include an infrared device and associated circuits and components, a Wi-Fi or a Bluetooth (trade-mark) communication module to provide for communication with similarly enabled systems and devices. Sub-system 406 may have one or more inputs or outputs to sub-system 404 in processing signals for its networks.

In addition to processing communication signals, DSP 430 provides control of receiver 426 and transmitter 424. For example, gains applied to communication signals in receiver 426 and transmitter 424 may be adaptively controlled through automatic gain-control algorithms implemented in DSP 430.

One particular operational aspect of receiver 422 and antenna 426 is that they need to be tuned to receive signals in the 802.11 network bands, e.g. signals in the 2.4 GHz to 5.8 GHz range for sub-systems 406 and if needed, sub-system 404. Additional filters on antenna may also be used to provide such functionality.

Receiver 422, antenna 426 and network connection module (NCM) 420N provide at least some of the hardware and software elements needed to detect when device 108 is in the presence of communication signals from network 110, thereby enabling device 108 to communication with other devices in network 110.

NCM 420N can receive and interpret the signals and can generate its own signals for transmission to network 110. The strengths of received signals may also be determined by NCM 420N. As described earlier, NCM 420N also has system and processes that controls the activation of the subsystems 404 and 406.

For example, if a first connection condition relating to the data link layer was to respond to every third beacon and second condition relating to the network layer was to respond to each ARP request, then NCM 420N may operate as follows to implement a power save mode.

First, NCM 420N sets controls for communication subsystems 406 or 404 of device 108 to sleep after the receipt of a beacon signal and then enter a power save mode for the next beacon signal, but re-awake for the third signal. When subsystems 404 and 406 are re-activated, device 108 can receive the (third) beacon signal and analyse its contents. If the beacon signal indicates that broadcast/multicast traffic is slated to follow it (via the encoded contents of the Bit Offset Map and the Traffic Indicator fields), then the device maintains the activation of subsystems 404 and 406 in order to receive that traffic, per the normal full power operation of device 108. Once the traffic is fully received and all relevant acknowledgement or error signals have been transmitted by device 108, the power save mode can then deactivate subsystems 404 and 406. As the power save mode has knowledge of the number of DTIM periods to sleep, an internal clock and counter can be used to determine the period of inactivation that would enable the power save mode to deactivate subsystems 404 and 406 immediately following a certain beacon signal and then re-activate those subsystems shortly before the anticipated receipt of the third beacon signal (or any other period that is used) and the timer may be reset (or not). The mechanism for tracking the clock and counter and issuing a re-activation signal may be implemented through an interrupt routine on device 108.

Second, in addition in order to maintain the connection for the network layer, device 108 needs to be able to receive and respond to each ARP request sent by an AP 116 while device 108 is within network 112. The period of transmissions of successive ARP requests has been noted to be in the order of minutes. For any power save mode, the last instance of the ARP request needs to be tracked and a timer initialized to track when the next expected ARP request is to be expected to be received. Again, this timer may be implemented through an interrupt routine on device 108. Once the timer provides its signal, the power save mode should re-activate subsystems 404 and 406. Then device 108 needs to wait for the expected next ARP request and then generate and transmit an appropriate response ping. Thereafter the power save mode may again de-activate subsystems 404 and 406 and the timer may be reset (or not). Alternatively or additionally, device 108 may anticipate an ARP request and generate an ARP response, or it may anticipate the ARP timeout and generate a unicast frame to the gateway such as an ICMP request (a ping).

Device 108 may also review its ARP cache and send additional unicast frames to other hosts in its table thereby ensuring that all hosts known by device 108 are contacted.

The next instance of the re-activation of subsystems 404 and 406 would be the earlier of the next activation cycle based on the beacon signals or the next activation cycle based on the ARP requests. In some cycles, the two activation cycles may overlap in whole or in part.

The power save mode may be activated upon predetermined conditions for device 108 or network 112. Exemplary conditions include entering the power save mode: after a predetermined time of non-use of device 108, after a predetermined period of no traffic sent between device 108 and network 112 or in either direction from or to device 108; or dependent on what application is running on the device; at a predetermined time (e.g. after 12:00 am); when device is at a predetermined location, etc. It is noted that IEEE 802.11 refers to the WLAN power save mode as "802.11 Power Save (PS)", for which features thereof may be incorporated into an embodiment.

Powering the entire electronics of the mobile handheld communication device is power source 434. In one embodiment, the power source 434 includes one or more batteries. In another embodiment, the power source 434 is a single battery pack, especially a rechargeable battery pack. A power switch (not shown) provides an "on/off" switch for device 108. A power source interface (not shown) may be provided in hardware, firmware, software or a combination of such elements to selectively control access of components in device 108 to power source 434. Upon activation of the power switch an application 420 is initiated to turn on device 108. Upon deactivation of the power switch, an application 420 is initiated to turn off device 108. Power to device 108 may also be controlled by other devices and by software applications 420.

Device 108 may also have global positioning system 436 to assist in identifying a present location of device 108 and may also have light sensor 438 to provide data on the ambient light conditions for device 108.

Although an embodiment has been described in terms of maintaining a data link connection for a 802.11 network and a connection link to an IP network, the features of an embodiment can be provided in other network technologies and other requirements for other layers in the OSI model. A notable feature of an embodiment is that more than one connection requirement is monitored and addressed while a device is in a power save mode.

In other embodiments, the power save mode may cause the subsystems 404 and 406 to re-activate themselves based on receipt of a signal indicating some event. As the subsystems 404 and 406 may not be powered, the signal may not originate externally. Alternatively or additionally, if subsystems 404 and 406 are placed in a low power operating mode, they may still be able to receive and transmit signals, albeit at perhaps a lower power level. In such an environment, the power save mode may monitor for specific "wake up" signals to trigger the (full or further) re-activation of subsystems 404 and 406.

In other embodiments, the two connection conditions may be in the same "layer" of the connection model governing the network.

It will be appreciated that PSM 402M, NCM 420N and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. For example, detection or completion of an event described in FIG. 2A may cause an interrupt to be generated on microprocessor 402 and a particular interrupt routine may be provided to process the event. It will further be appreciated that other applications and systems on device 108 may be executing concurrently with PSM 402M, NCM 420N or other modules. As such, PSM 420M and NCM 420N may be structured to operate in as a "background" application on device 108, using programming techniques known in the art.

Further in other embodiments, power save modes may be designed to work with Wi-Max networks, i.e. 802.16-class networks, in place of 802.11-class networks.

The present invention is defined by the claims appended hereto, with the foregoing description being merely illustrative of embodiments of the invention. Those of ordinary skill may envisage certain modifications to the foregoing embodiments which, although not explicitly discussed herein, do not depart from the scope of the invention, as defined by the appended claims.

The invention claimed is:

1. A method for selectively reducing power consumption of a communication device communicating with a 802.11-class wireless network, comprising:
   de-activating at least one communication subsystem of said device during intervals when said device is placed in a power save mode; and
   while said device is in said power save mode
      for a first period beginning at a first instance, re-activating said at least one communication subsystem, executing an action relating to a first data link layer connection condition for said network, and then de-activating said at least one communication subsystem; and
      for a second period beginning at a second instance, re-activating said at least one communication subsystem, generating and transmitting a frame to a host in said network by said device, and then de-activating said at least one communication subsystem,
   wherein
      said first period is timed to allow said device to receive a MAC beacon signal;
      said second period is set to relate to a frequency of transmission of an Address Resolution Protocol (ARP) request for an Internet Protocol (IP) address for said device;
      said first period is repeated on a cycle that is based on a first frequency of occurrence of said data link layer connection condition; and
      said second period is repeated on a cycle that is based on a second frequency of occurrence of a network layer connection condition for said network.

2. The method for selectively reducing power consumption of a communication device as claimed in claim 1, wherein to frame is a unicast frame.

3. The method for selectively reducing power consumption of a communication device as claimed in claim 1, wherein for said first period:
   if said beacon signal indicates broadcast or multicast traffic from said network intended for said device follows said beacon signal, said at least one communication subsystem is de-activated after an end of transmission of said broadcast or multicast traffic; and
   if said beacon signal indicates that no broadcast or multicast traffic from said network intended for said device follows said beacon signal, said at least one communication subsystem is de-activated after completion of reception of said beacon signal.

4. The method for selectively reducing power consumption of a communication device as claimed in claim 1, wherein said first frequency of occurrence is determined from a delivery traffic indication map (DTIM) value in said beacon signal, such that if said DTIM value equals 1, then said first frequency of occurrence is set to be related to a larger DTIM value.

5. The method for selectively reducing power consumption of a communication device as claimed in claim 4, wherein for said second period, said second frequency of occurrence is set to be shorter than said frequency of transmission of said ARP by at least one host in said network.

6. The method for selectively reducing power consumption of a communication device as claimed in claim 4, wherein if said DTIM value equals 1, then said first cycle is set to span three or more MAC beacon signal intervals.

7. The method for selectively reducing power consumption of a communication device as claimed in claim 6, wherein if said DTIM value equals 1, then said first cycle is set to span between three and eight MAC beacon signal intervals.

8. The method for selectively reducing power consumption of a communication device as claimed in claim 1, wherein for said second action further comprises transmitting a unicast frame to other hosts listed in an ARP cache of said device.

9. The method for selectively reducing power consumption of a communication device as claimed in claim 1, wherein said second period is repeated on a cycle that is set to be shorter than a frequency of transmission of said ARP request from said network.

10. The method for selectively reducing power consumption of a communication device as claimed in claim 1, wherein a delivery traffic indication map (DTIM) value is used to indicate a de-activation period for said at least one communication subsystem.

11. The method for selectively reducing power consumption of a communication device as claimed in claim 1, wherein a clock in said device tracks an elapsed time between receipt of said ARP request and receipt of a next ARP request to determine said second period of said power save mode.

12. The method for selectively reducing power consumption of a communication device as claimed in claim 1, wherein said first period is extended for a predetermined period when broadcast traffic to said device from said network is being sent to said device to allow said device to receive said broadcast traffic.

13. The method for selectively reducing power consumption of a communication device as claimed in claim 1, wherein said first period is reduced by a first offset relating to a reactivation time required by said device to re-activate said at least one communication subsystem.

14. A communication device having a power save mode, comprising:
   at least one communication subsystem providing transmission and reception of signals with a wireless 802.11-class network;
   a microprocessor;
   a timer;
   a first module to selectively activate and de-activate said at least one communication subsystem when said device is operating in said power save mode; and a second module to control said first module and said at least one communication subsystem while said device is in said power save mode such that
for a first period beginning at a first instance, said second module initiates said first module to re-activate said at least one communication subsystem, said second module executes an action relating to a data link layer connection requirement for said network, and then said second module initiates said first module to de-activate said at least one communication subsystem; and
for a second period beginning at a second instance, said second module initiates said first module to re-activate said at least one communication, said second module generates and transmits a unicast frame to a host in said network by said device relating to a network layer connection requirement for said network, and then said second module initiates said first module to de-activate said at least one communication subsystem,
wherein
said first period is timed to allow said device to receive a MAC beacon signal;
said second period is set to relate to a frequency of transmission of an Address Resolution Protocol (ARP) request for an Internet Protocol IP address for said device;
said first period is repeated on a cycle that is based on a first frequency of occurrence of said data link layer connection condition; and
said second period is repeated on a cycle that is based on a second frequency of occurrence of a network layer connection condition for said network.

15. The communication device having a power save mode as claimed in claim 14, wherein for said first period:
if said beacon signal indicates broadcast or multicast traffic from said network intended for said device follows said beacon signal, said at least one communication subsystem is de-activated after an end of transmission of said broadcast or multicast traffic; and
if said beacon signal indicates that no broadcast or multicast traffic from said network intended for said device follows said beacon signal, said at least one communication subsystem is de-activated after an end of transmission of said beacon signal.

16. The communication device having a power save mode as claimed in claim 14, wherein said first frequency of occurrence is determined from a delivery traffic indication map (DTIM) value in said beacon signal, such that if said DTIM value equals 1, then said first frequency of occurrence is set to be related to a larger DTIM value.

17. The communication device having a power save mode as claimed in claim 14, wherein said second action further comprises transmitting a unicast frame to other hosts listed in an ARP cache of said device.

18. The communication device having a power save mode as claimed in claim 14, wherein for said second instance, said second frequency of occurrence is set to be shorter than said frequency of transmission of said Address ARP by at least one host in said network.

19. The communication device having a power save mode as claimed in claim 14, wherein a delivery traffic indication map (DTIM) value is used to indicate a de-activation period for said at least one communication subsystem.

* * * * *